United States Patent Office 2,728,951
Patented Jan. 3, 1956

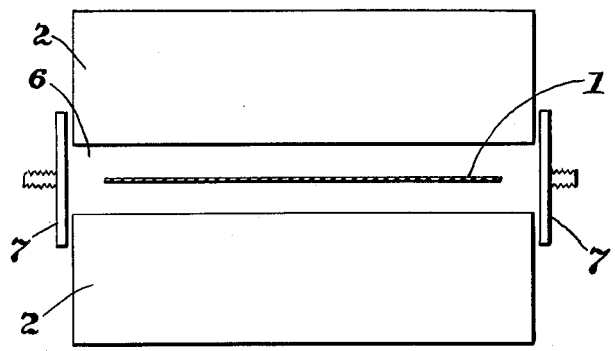
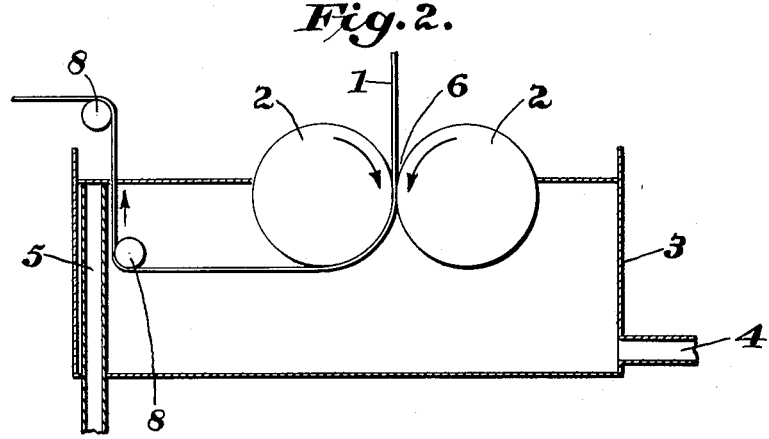
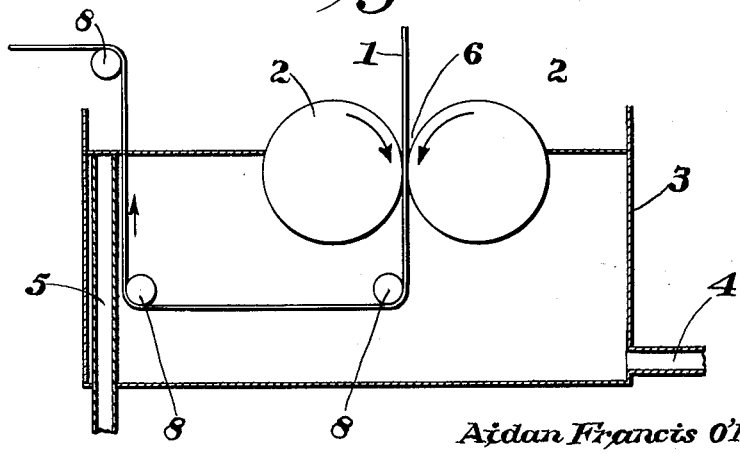
INVENTORS:
Aidan Francis O'Hanlon,
Jack Witherington Cornforth,
BY Cushman, Darby & Cushman
ATTORNEYS.

2,728,951

PROCESS FOR QUENCHING MELT EXTRUDED FILM

Aidan Francis O'Hanlon, High Salvington, near Worthing, and Jack Witherington Cornforth, Harpenden, England, assignors to Imperial Chemical Industries Limited, London, England, a corporation of Great Britain Application January 19, 1953, Serial No. 332,023

Claims priority, application Great Britain January 23, 1952

18 Claims. (Cl. 18—48)

This invention relates to the production of artificial films and more particularly to the production of films from highly polymeric synthetic linear compounds. In the term "highly polymeric synthetic linear compounds" as used throughout this specification we include the linear condensation superpolymers and particularly linear superpolyesters (including interpolyesters) obtainable from aromatic dicarboxylic acids and glycols, and linear superpolyamides (including interpolyamides), that may be made into filaments and cold-drawn to yield fibres of high tenacity. Particularly useful for film manufacture are polyethylene terephthalate, and the superpolyamides obtainable from adipic or sebacic acid and hexamethylene diamine, and that obtainable from caprolactam.

It is known in the art that films can be made from this class of materials by rapidly cooling a thin layer of the molten material. The present invention is directed to an improved method for carrying out this cooling step for extruded films.

According to this invention a process for the production of films comprises cooling a melt extruded film of a highly polymeric synthetic linear compound by passing it downwards in its molten state into a pool of liquid maintained in the nip formed between two contra-rotating rolls, the two rolls being rotated at equal peripheral speed and each roll, at the nip, rotating in the direction of travel of the film, which passes through the nip.

The pool of liquid may be maintained in the nip of the rolls in a variety of ways. In a preferred method, the nip rolls are immersed to a depth less than their diameter in a bath of the liquid, and the rotation of the rolls carries a film of the liquid round into the nip and there forms a pool; a small amount of a wetting agent may be added to the liquid to ensure that sufficient is carried into the nip. Another suitable method is that of spraying the liquid on to the rolls or on to the molten film before the film reaches the nip. If the latter method is used, care must be taken to avoid marking the film by sudden contact of the molten film with droplets of liquid. The depth of the pool of liquid formed in the nip can vary and may be as high as the radius of the rolls; it must always be sufficient to provide enough liquid to cool the film sufficiently.

Any non-volatile liquid may be used for cooling the film, provided that it does not significantly attack or react disadvantageously with the film during the cooling operation. For water-insoluble films, such as nylon and polyethylene terephthalate films, it is preferred that the liquid be water or a water-soluble liquid having a boiling point not substantially below that of water; such liquids can easily be removed from the surfaces of the film. Glycerol is a particularly suitable liquid for use with nylon or polyethylene terephthalate film, and it may if desired be used in admixture with water. For example, mixtures of glycerol with up to about 25% by weight of water are very satisfactory; these mixtures combine the advantage of having a much higher boiling point than water with that of having a lower viscosity than pure glycerol and hence a reduced tendency to be carried by the rolls from the bath to nip in such large amounts as to produce turbulence in the pool. Glycol is another water-soluble liquid suitable for use with nylon and polyethylene terephthalate film, particularly if diluted with water; but care must be taken to avoid contact of the film with glycol over long periods, or some solution of the film may occur.

The temperature of the cooling liquid must be sufficiently below the melting point of the highly polymeric linear compound to cause the molten film to solidify. Because of the high melting points of the polymers used, there may be a tendency for the liquid in contact with the freshly extruded film to boil locally, particularly when the liquid is water or another liquid having a boiling point far below the melting point of the polymer. This tendency is shown particularly when the film being extruded is more than about 0.003 inch thick, or when low rates of extrusion are used. Higher extrusion rates result in greater agitation of the layers of liquid in contact with the film surfaces, and so reduce overheating of the liquid. Local boiling can take place irrespective of the depth of the pool in the nip; it causes defects such as rippling and surface streaks and blotches to appear on the film. Therefore, if such boiling occurs the liquid used for cooling should be replaced by another liquid having a boiling point sufficiently high for local boiling to be prevented.

It is to be understood that liquid is supplied to the nip at a rate sufficiently high to maintain a pool therein; this pool is preferably maintained at a substantially constant depth by allowing the liquid to flow from the ends of the nip at a controlled rate. This may be done, for example, by placing plates across the ends of the nip, the space between the ends of the rolls and the plates being adjustable.

The bulk of the liquid, in the bath, is preferably maintained at a temperature as low as possible by any convenient method. When the liquid in water, a sufficiently low temperature can usually be maintained by allowing mains water to flow in at one end of the bath and out at the opposite end. When other liquids are used they may be suitably chilled, for example, by means of cooling coils immersed in the bath or by circulating the liquid from the bath through a refrigerating system and back to the bath.

The radius of the nip rolls may vary within wide limits; it is necessary only that the radius be such as to allow an adequate amount of liquid to be carried into the nip, but not so much as to cause turbulence in the pool. In general, the optimum radius increases with the speed at which the film is to be drawn from the extrusion orifice, that is, with the peripheral speed of the rolls; it also increases with the viscosity of the liquid. It is usually most convenient to use rolls of radius not exceeding 9 inches, since a greater radius will usually make it difficult for the extrusion die to be brought sufficiently close to the nip. When the rolls are partly immersed in the liquid and are to be rotated at very high speeds, it is preferred that they be immersed to a depth not greater than three-quarters of their diameter; this precaution prevents the liquid from being carried over to the nip in amounts large enough to cause ripples on the surface of the pool. Other conditions being unchanged, the optimum depth of immersion of the rolls decreases with increasing viscosity of the liquid used. It will be appreciated that this optimum depth is the greatest depth to which the rolls can be immersed (and hence the depth giving the most rapid rate of supply of the liquid) without causing sufficient turbulence to affect disadvantageously the surface characteristics of the film.

Apparatus for operating the process hereinbefore described comprises a pair of contra-rotatable nip rolls, means for extruding a molten film downwards into the nip of the rolls, means for supplying liquid to the nip and maintaining a pool of liquid therein, and means for adjusting the rate of outflow of liquid from the pool at the ends of the nip.

Reference will now be made to the accompanying drawings which illustrate diagrammatically, and by way of example, an apparatus useful for carrying out the invention, and designed for use with water as the cooling liquid.

Figure 1 is a plan view of such apparatus; and

Figures 2 and 3 show two forms of the apparatus in vertical section.

In these drawings, 1 is a freshly extruded, molten film which passes to the nip of steel rollers 2, which are immersed to a depth of about two-thirds of their diameter in water contained in a bath 3. Cold water is supplied to this bath at the inlet 4 and flows out at the adjustable overflow 5. Water is carried over on the surface of the rotating rolls and this raises the level of the water in the pool 6 above that of the water in the bath. This level is maintained by the end plates 7 at each end of the nip; these plates are adjusted to allow excess water to flow from each end of the nip at such a rate that the level of the pool 6 remains substantially constant. Idler rolls 8 are provided round which the film travels through and out of the bath to the wind-up roller.

Many modifications of the apparatus particularly described may be useful for carrying out the present invention. As stated hereinbefore, other methods may be used to supply water to the nip of the rollers; and when a liquid other than water is used, it will generally be desirable to provide means for cooling and conserving the liquid in the bath. This may be done, for example, by circulating the liquid through a refrigerating system, or by immersing cooling coils in the bath itself.

After passing between the nip rolls the film, which is now solidified to a greater or lesser degree, may be passed round one of the rolls and led directly to a further processing step, or may be reeled directly. It may be desirable, particularly if the film is thick, to pass it through a bath of liquid, to ensure complete and thorough cooling, before it is further processed or reeled.

The advantages obtained by passing the molten film of highly polymeric synthetic linear compound into the pool between two nip rolls rather than directly into a bath of the cooling liquid are mainly concerned with the quality of film produced. If the molten film is passed directly into a cooling bath, which must of necessity have a fairly large surface area, any ripples and disturbances which may be set up on the surface of the bath will cause the molten film to wobble instead of following a straight path from the extruder to the nip, and this will give rise to irregular thickness and surface defects in the film. Although these defects may not always be visible to the naked eye before the film is subjected to further treatment, e. g. stretching treatments, the final film produced will be found to be of uneven quality. Using the process of the present invention there is produced film of high surface quality, of regular thickness and of very uniform appearance.

The process of the present invention is used with particular advantage in the production of films from materials that are highly mobile when in the molten state and give relatively stiff films when solidified. Such films are most likely to be adversely affected by ripples and other disturbances in the cooling water. The process is of particular value for use in the production of film from polyethylene terephthalate. This material forms stiff films from a highly mobile melt, and the film has exceptionally high clarity and surface lustre; but the latter properties can very easily be spoiled unless the film is quenched under carefully controlled conditions.

Our invention is illustrated but not limited by the following examples.

*Example I*

Highly polymeric polyethylene terephthalate was melted and extruded through a slot orifice 8 inches long and 0.015 inch wide. The molten film was passed vertically through a 2 inch air gap to the surface of a pool of water contained in the nip of the pair of rolls in apparatus as shown in the accompanying drawings, and on through the nip of the rolls. These rolls were polished chromium plated rolls 4 inches in diameter, immersed in the water to a depth two-thirds of their diameter, and rotated at a peripheral speed of 70 ft./minute. The film, which had solidified before it reached the nip of the rolls, was passed round one of the nip rolls and round the two idler rolls to the wind-up reel.

The level of the pool of liquid in the nip was maintained at a depth of 1 inch by adjustment of the end plates in accordance with the rate at which water was carried into the nip on the surface of the rolls. The rate of extruding the film was so adjusted to the haul off speed that the film was drawn down to a final thickness of 0.004 inch.

The film so produced was of excellent quality, being of high clarity and lustre and free from surface blemishes.

*Example II*

Using the same apparatus as in Example I, film of highly polymeric polyethylene terephthalate was made at a speed of 30 ft./minute, with the rate of extrusion and the width of the slot orifice again adjusted to give a film thickness of 0.004 inch. This film showed surface defects caused by local boiling of the water.

The water in the bath was then replaced by a mixture of 80% glycerol with 20% of water, this mixture being maintained at a temperature of 40° C. by pumping it from one end of the bath and returning it to the other by way of cooling coils; the nip rolls were immersed to a depth only ¼ of their diameter; and the end plates were moved to a distance of ½ inch from the ends of the nip. The film so produced was of excellent quality, and showed no signs of boil marks or other surface defects.

*Example III*

Using the apparatus and method described in Example II, with a glycerol/water cooling mixture, but with appropriate adjustment of the extrusion rate and take-off speed, polyethylene terephthalate film 0.008 inch thick was made at take-off speeds of from 20 to 100 ft./minute. The film so produced was in every case of excellent quality.

*Example IV*

For purposes of comparison, in the apparatus and method described in Example I the nip rolls were immersed in the water to a depth 1/16 inch greater than their diameter, so that the water surface broken by the melt in entering the bath extended across the whole width of the bath. The nip rolls were rotated at a peripheral speed of 30 ft./minute, and the output of the extruder was adjusted to give film 0.008 inch thick. It was found that ripples on the surface of the bath, which were inevitably produced in operating the process, deflected the molten film from its path and resulted in the formation of corrugations as the film solidified. The corrugated film, in emerging from the bath, set up more ripples on the surface of the water, and these travelled across the bath to form further corrugations on the newly extended film. A process was thus established in which there was produced film having substantially regular, deep corrugations. The corrugations had an amplitude of approximately 1.5 inches and a depth of approximately 0.38 inch; they rendered the film useless for any of its normal applications.

We claim:

1. A process for quenching a melt extruded film of a highly polymeric synthetic linear compound which comprises passing the film downwards in its molten state into a pool of liquid maintained in the nip formed between two contra-rotating rolls, said liquid being maintained at a temperature considerably below its own boiling point, being of sufficient quantity and depth and being sufficiently below the melting point of the polymeric compound to bring about rapid chilling of the film to the solid state, the two rolls being rotated at equal peripheral speed and each roll, at the nip, rotating in the direction of travel of the quenched film which passes through the nip.

2. A process according to claim 1 in which the contra-rotating rolls are immersed to a depth less than their diameter in a bath of the liquid, and the pool is formed and maintained from liquid carried into the nip on the surface of the rotating rolls.

3. A process according to claim 2 in which the rolls are immersed to a depth not greater than three-quarters of their diameter.

4. A process according to claim 1 in which the synthetic linear compound is selected from the group consisting of a superpolyamide and a superpolyester.

5. A process according to claim 4 in which the synthetic linear compound is polyethylene terephthalate.

6. A process according to claim 4 in which the cooling liquid comprises glycerol.

7. A process according to claim 4 in which the cooling liquid comprises a glycerol/water mixture, containing not more than about 25% by weight of water.

8. The process of claim 4, wherein the solvent comprises glycol.

9. The process of claim 1, wherein the synthetic linear compound is polyethylene terephthalate and the cooling liquid comprises glycerol.

10. The process of claim 9, wherein the cooling liquid comprises a glycerol water mixture containing not more than about 25% by weight of water.

11. The process of claim 1, in which the synthetic linear compound is selected from the group of a superpolyamide and a superpolyester and the cooling liquid comprises water.

12. The process of claim 11, wherein the synthetic linear compound is polyethylene terephthalate.

13. A process for quenching a melt extruded film of a highly polymeric synthetic linear compound which comprises passing the film downwards in its molten state into a pool of liquid maintained in the nip formed between two contra-rotating rolls, said liquid being maintained at a temperature considerably below its own boiling point and not above about 40° C., being of sufficient quantity and depth and being sufficiently below the melting point of the polymeric compound to bring about rapid chilling of the film to the solid state, the two rolls being rotated at equal peripheral speed and each roll, at the nip, rotating in the direction of travel of the quenched film which passes through the nip.

14. The process of claim 13, wherein the synthetic linear compound is selected from the group consisting of polyethylene terephthalate.

15. The process of claim 14, wherein the liquid comprises glycerol.

16. The process of claim 14, wherein the liquid comprises water.

17. The process of claim 14, wherein the liquid comprises a mixture of glycerol and water containing not more than about 25% by weight of water.

18. The process of claim 14, wherein the pool has a depth of about one inch.

References Cited in the file of this patent

UNITED STATES PATENTS

| | | |
|---|---|---|
| 2,128,941 | Hudson | Sept. 6, 1938 |
| 2,212,772 | Graves | Aug. 27, 1940 |
| 2,585,156 | Montross | Feb. 12, 1952 |
| 2,624,913 | Montross et al. | Jan. 13, 1953 |